(12) United States Patent
Dahlmanns et al.

(10) Patent No.: US 11,884,434 B2
(45) Date of Patent: Jan. 30, 2024

(54) PACKAGING MACHINE AND METHOD FOR PRODUCING A PACKAGING UNIT AS WELL AS A PACKAGING UNIT MADE OF PACKAGING SLEEVES AND AN OUTER PACKAGING

(71) Applicant: SIG Technology AG, Neuhausen am Rheinfall (CH)

(72) Inventors: Kurt Dahlmanns, Gangelt (DE); Dieter Diesinger, Herzogenrath (DE); Georg Schulte, Toenisvorst (DE); Richard Leufen, Linnich (DE)

(73) Assignee: SIG Technology AG, Neuhausen am Rheinfall (CH)

( * ) Notice: Subject to any disclaimer, the term of this patent is extended or adjusted under 35 U.S.C. 154(b) by 777 days.

(21) Appl. No.: 16/471,305

(22) PCT Filed: Dec. 22, 2017

(86) PCT No.: PCT/EP2017/084459
§ 371 (c)(1),
(2) Date: Jun. 19, 2019

(87) PCT Pub. No.: WO2018/115478
PCT Pub. Date: Jun. 28, 2018

(65) Prior Publication Data
US 2020/0017248 A1 Jan. 16, 2020

(30) Foreign Application Priority Data
Dec. 23, 2016 (DE) ...................... 10 2016 125 588.2

(51) Int. Cl.
*B65B 51/30* (2006.01)
*B29C 65/10* (2006.01)
(Continued)

(52) U.S. Cl.
CPC ............ *B65B 51/303* (2013.01); *B29C 65/10* (2013.01); *B29C 65/224* (2013.01);
(Continued)

(58) Field of Classification Search
CPC ....... B65B 11/10; B65B 25/145; B65B 51/32; B65B 53/06; B65B 61/06; B65B 63/02;
(Continued)

(56) References Cited

U.S. PATENT DOCUMENTS 2,741,885 A * 4/1956 Allison ............... B29C 65/7433
53/526
3,564,810 A 2/1971 Faletti et al.
(Continued)

FOREIGN PATENT DOCUMENTS

AT 347330 B 12/1978
CN 1181045 A 5/1998
(Continued)

OTHER PUBLICATIONS

Jiyu et al., "Cargo Transportation and Packaging", Press of University of Science and Technology of China, Jan. 31, 2010, 5 pages.

*Primary Examiner* — Christopher R Harmon
(74) *Attorney, Agent, or Firm* — The Webb Law Firm

(57) ABSTRACT

Shown and described are a packaging machine and a method for producing a packaging unit from a packaging sleeve group comprising a plurality of flat folded, upright packaging sleeves, and an outer packaging. It is provided that the packaging machine comprises at least one conveyer unit for conveying the packaging sleeve group in a conveyor direction perpendicular to the longitudinal extent of the packaging group and at least one outer packaging unit for preparing an outer packaging-shaping sheet material in a base position, and in that, seen in the conveyor direction behind the sheet material in the base position, a sealing unit is provided for
(Continued)

sealing of the sheet material enclosed in the packaging sleeve group.

14 Claims, 13 Drawing Sheets

(51) Int. Cl.
| | |
|---|---|
| B29C 65/22 | (2006.01) |
| B29C 65/74 | (2006.01) |
| B29C 65/00 | (2006.01) |
| B65B 11/10 | (2006.01) |
| B65B 51/32 | (2006.01) |
| B65B 53/06 | (2006.01) |
| B65B 61/06 | (2006.01) |
| B65D 75/00 | (2006.01) |

(52) U.S. Cl.
CPC ........ *B29C 65/7451* (2013.01); *B29C 66/344* (2013.01); *B29C 66/43121* (2013.01); *B29C 66/723* (2013.01); *B29C 66/83221* (2013.01); *B29C 66/849* (2013.01); *B65B 11/10* (2013.01); *B65B 51/32* (2013.01); *B65B 53/06* (2013.01); *B65B 61/06* (2013.01); *B65D 75/002* (2013.01); *B29C 2793/0027* (2013.01); *B29C 2793/0072* (2013.01)

(58) Field of Classification Search
CPC ..... B65B 51/303; B29C 65/10; B29C 65/224; B29C 65/7451; B29C 2793/0072; B29C 66/344; B29C 66/43121; B29C 66/723; B29C 66/83221; B29C 66/849; B65D 75/002

See application file for complete search history.

(56) References Cited

U.S. PATENT DOCUMENTS

| | | | | |
|---|---|---|---|---|
| 3,643,396 | A | * | 2/1972 | Togashi ................ B65B 25/14 53/529 |
| 4,075,815 | A | * | 2/1978 | Carver, Jr. ............. B65B 11/10 53/74 |
| 4,167,841 | A | * | 9/1979 | Camp .................... B65B 9/026 53/399 |
| 4,509,314 | A | * | 4/1985 | Bozza .................... B65B 11/10 53/586 |
| 4,662,148 | A | * | 5/1987 | Nilsson ................. B65B 11/10 53/399 |
| 4,707,970 | A | | 11/1987 | Labombarde et al. |
| 5,129,211 | A | * | 7/1992 | Andersson ............ B65B 71/08 53/399 |
| 5,941,052 | A | | 8/1999 | Evangelisti |
| 6,282,868 | B1 | | 9/2001 | Vlaam |
| 6,662,533 | B1 | * | 12/2003 | Holm .................... B65B 9/026 53/586 |
| 2013/0067864 | A1 | | 3/2013 | Dwyer |

FOREIGN PATENT DOCUMENTS

| | | |
|---|---|---|
| CN | 2485225 Y | 4/2002 |
| CN | 204096111 U | 1/2015 |
| DE | 2011137 A1 | 11/1971 |
| DE | 4206968 A1 | 9/1992 |
| DE | 102010032455 A1 | 2/2012 |
| EP | 0118849 A1 | 9/1984 |
| EP | 0592049 A1 | 4/1994 |
| EP | 1000860 A1 | 5/2000 |
| FR | 2196939 A1 | 3/1974 |
| GB | 1594939 A | 8/1981 |
| JP | S5146280 A | 4/1976 |
| JP | 2205511 A | 8/1990 |
| JP | 2013199311 A | 10/2013 |
| JP | 201563650 A | 4/2015 |
| JP | 201678855 A | 5/2016 |
| WO | 9631397 A1 | 10/1996 |

* cited by examiner

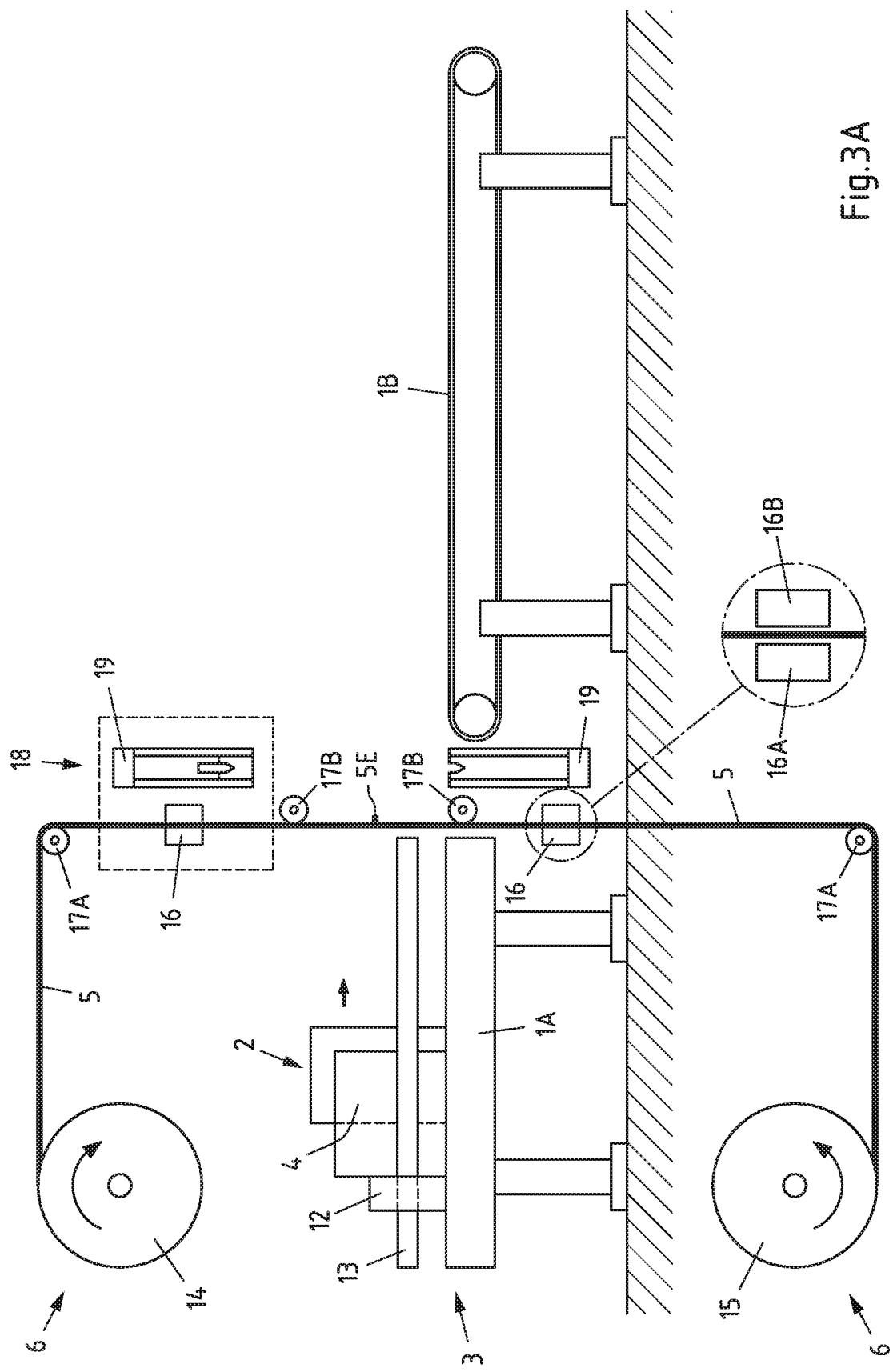

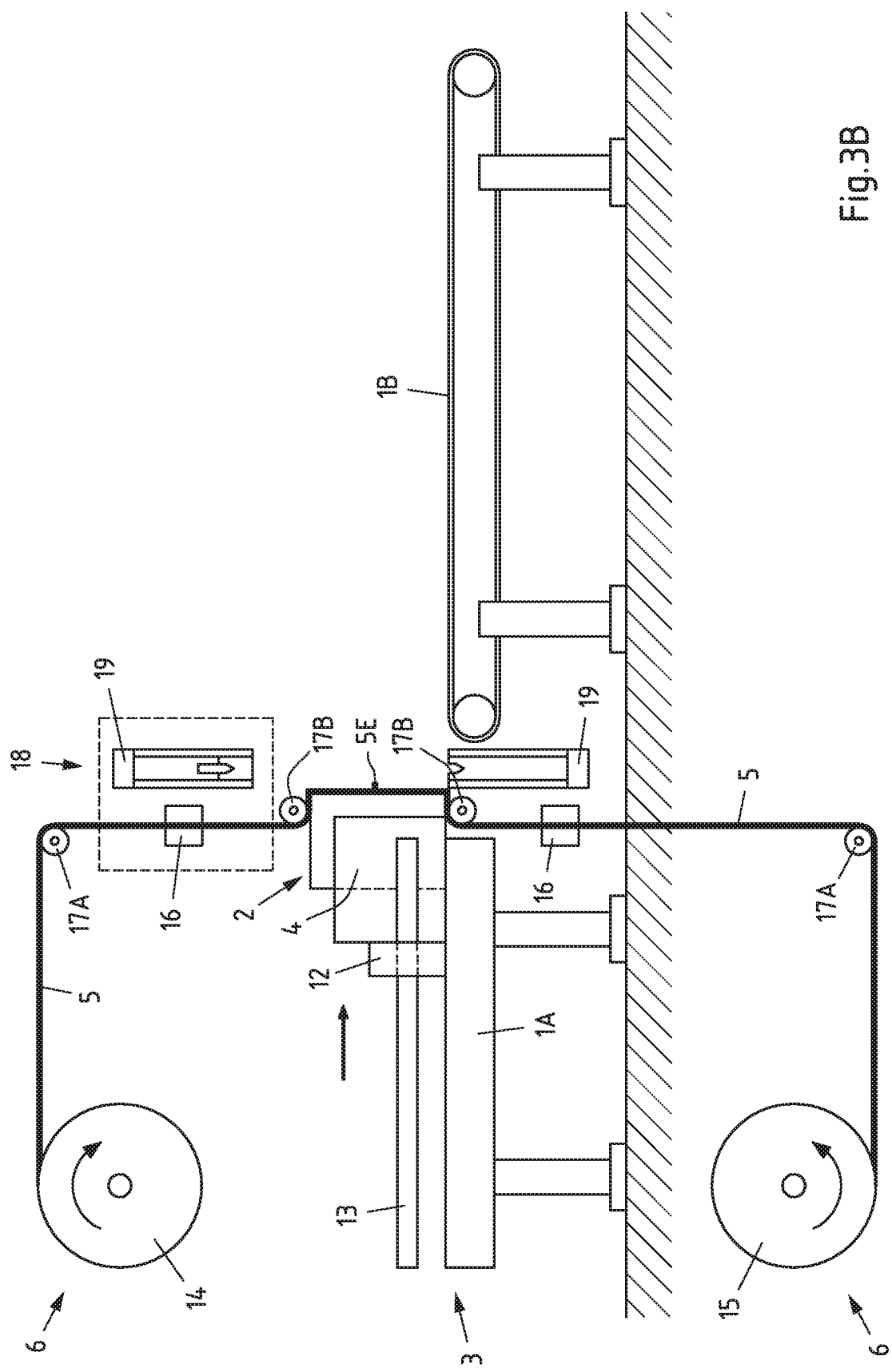

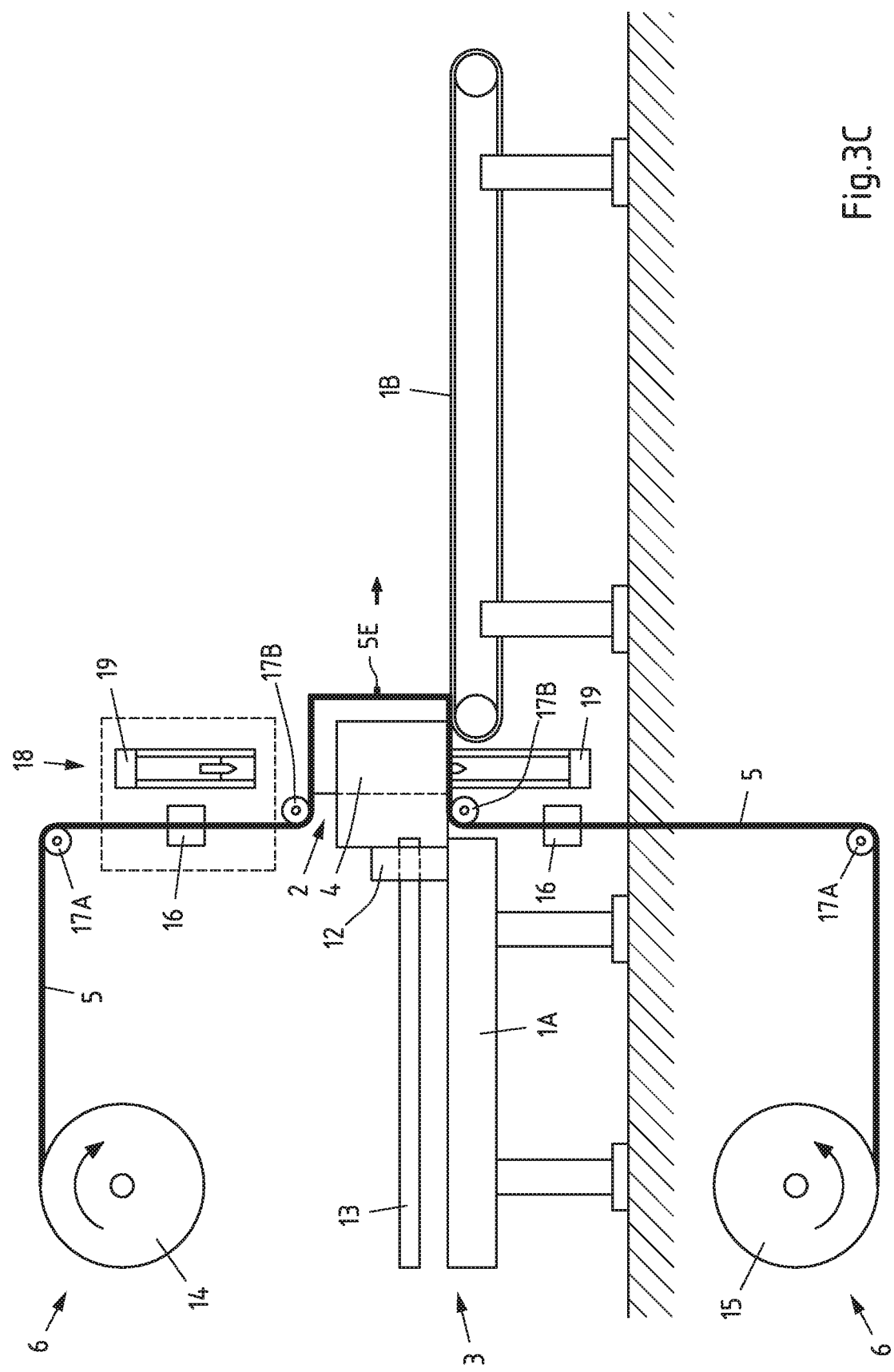

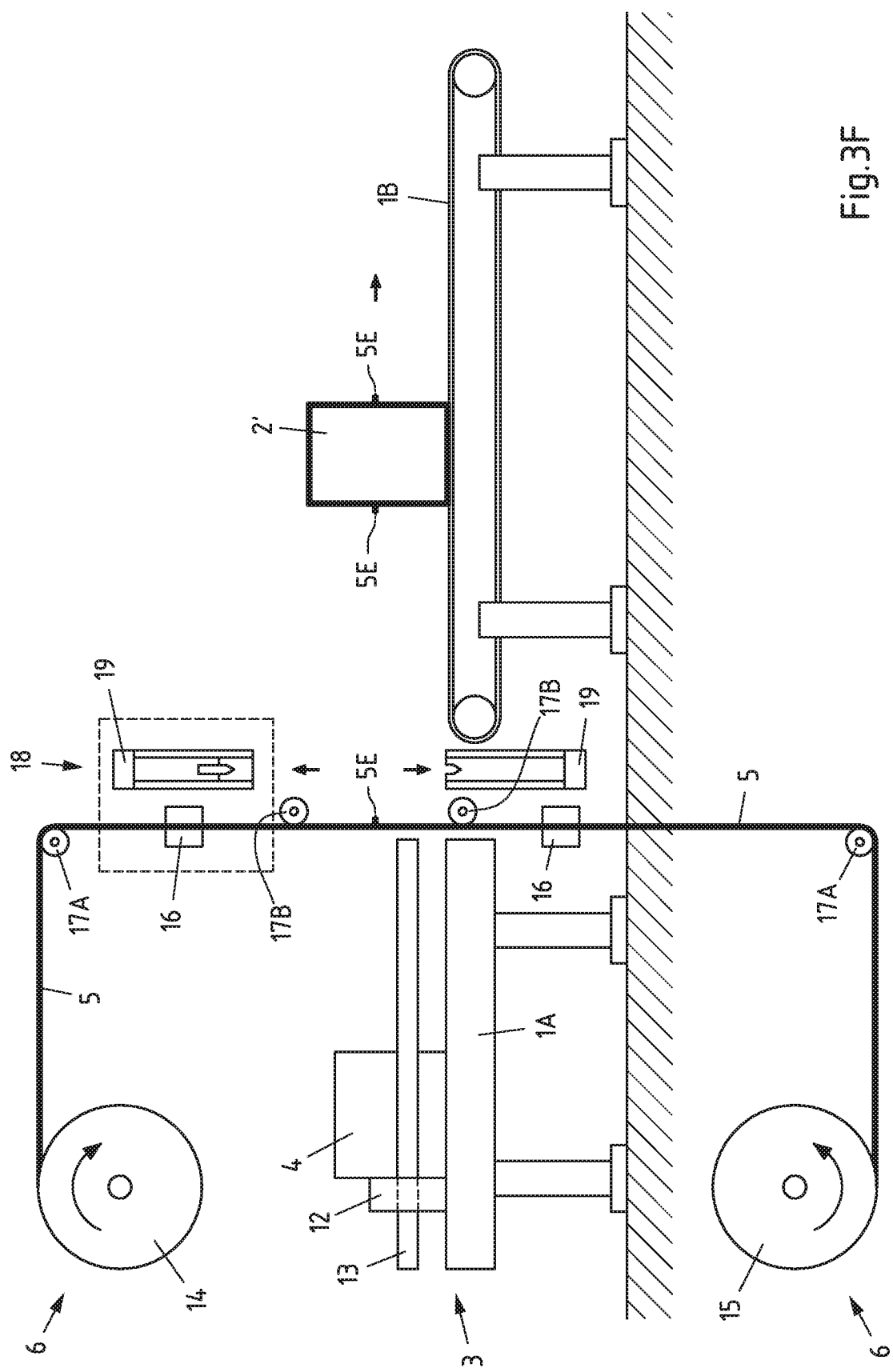

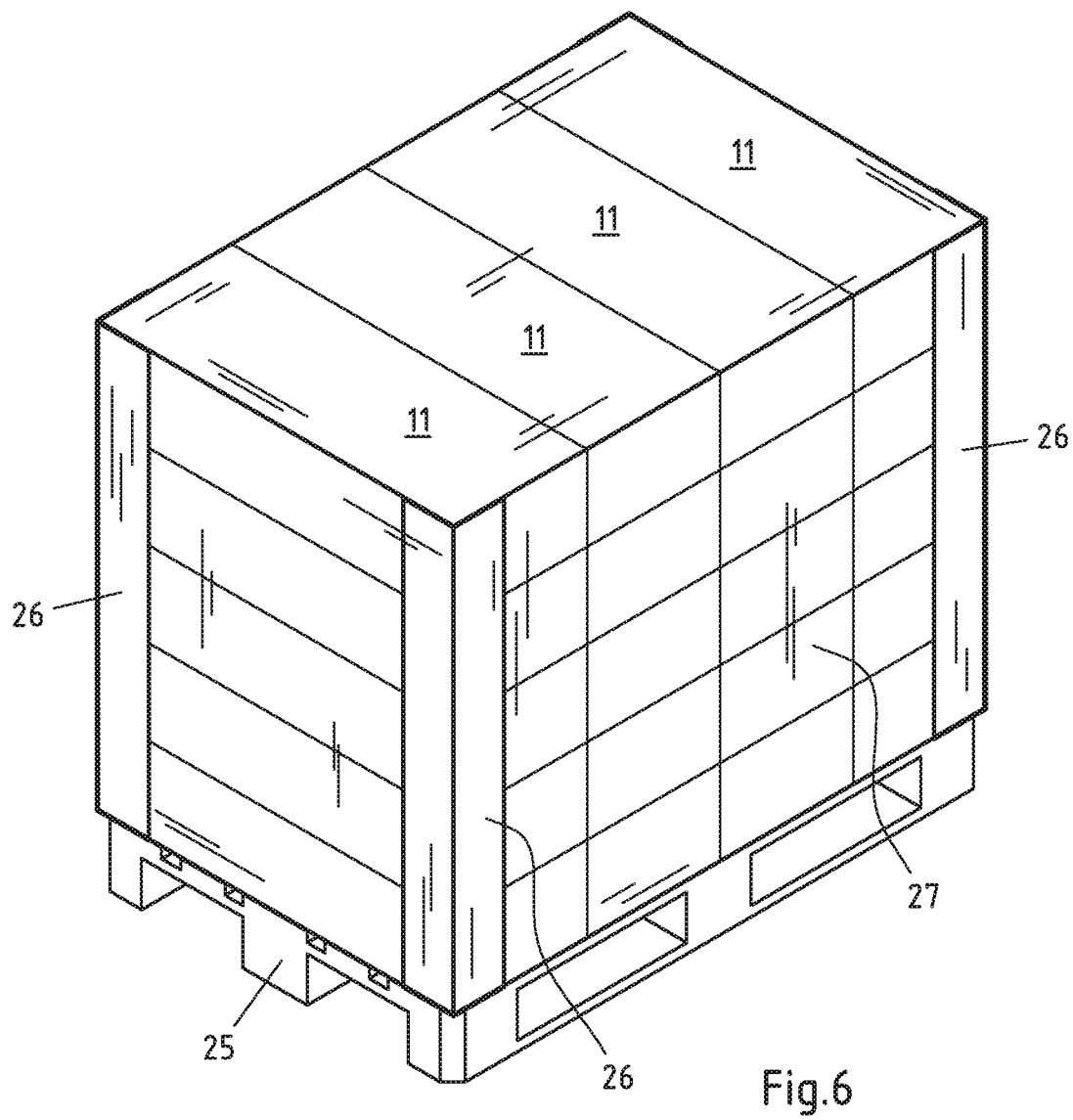

PACKAGING MACHINE AND METHOD FOR PRODUCING A PACKAGING UNIT AS WELL AS A PACKAGING UNIT MADE OF PACKAGING SLEEVES AND AN OUTER PACKAGING

CROSS-REFERENCE TO RELATED APPLICATIONS

This application is the United States national phase of International Application No. PCT/EP2017/084459 filed Dec. 22, 2017, and claims priority to German Patent Application No. 10 2016 125 588.2 filed Dec. 23, 2016, the disclosures of which are hereby incorporated by reference in their entirety.

BACKGROUND OF THE INVENTION

The invention relates to a packaging machine for producing a packaging unit made of a packaging sleeve group comprising a plurality of flat folded, upright packaging sleeves, and an outer packaging, comprising at least one conveyer unit for conveying the packaging sleeve group and at least one outer packaging unit for preparing an outer packaging-shaping sheet material in a base position, that, seen in the conveyor direction behind the sheet material in the base position, a sealing unit is provided for sealing of the sheet material enclosed in the packaging sleeve group.

Upright packaging sleeves should include sleeves standing upright either on a longitudinal edge or on a cutting edge. The longitudinal edge is generally generated by a crease line and the cutting edge by open composite material. A packaging sleeve group made by such flat folded, upright and adjacent packaging sleeves comprises, therefore, two opposite sides of longitudinal edges of the packaging sleeves wherein the other opposite longitudinal sides comprise open cutting edges. Here it can be advantages to protect the longitudinal sides with the open cutting edges of the packaging sleeves, as known per se, against the intrusion of dirt or microbes by treating those sides with a sterilization agent. The open cutting edges can be treated with a liquid sterilization agent or, at least indirectly, in contact with strips or sheets seeded with sterilization agent, in order to create an atmosphere inside the outer packaging being sufficiently sterilized.

Numerous types of outer packaging are known from the field of packaging technology. Outer packaging is designated as packaging whose intended content is other packages. Packages are thus also designated as primary packaging and outer packaging as secondary packaging. Packages or primary packaging can for example also be considered as packaging sleeves. Packaging sleeves serve as 'semi-finished products' for the production of foodstuff or beverage packages. Packaging sleeves are produced from flat blanks and can for example be produced by folding the blank and welding or bonding a seam. A blank Z known from the prior art is represented in FIG. 1A and FIG. 1B shows a packaging sleeve P produced in the manner described.

Such a packaging sleeve P is characterised in that it is sealed by welding the longitudinal seam S from FIG. 1A onto at least one longitudinal side, but is open at two opposing sides. The packaging sleeve is stored flat folded and is packaged in the already mentioned outer packaging for further transport, for example to another location for the purposes of filling or production of the final package.

Outer packaging or secondary packaging thus has inter alia the purpose of combining a plurality of packaging sleeves to form units in order to be able to transport them easily on pallets or the like in a stacked and compact manner. A further function of outer packaging is to protect the packaging sleeves contained in the outer packaging from external influences such as bumps, damage or soiling. The units of packaging sleeves delivered by the outer packaging are supplied for example directly to a filling machine at their intended location.

In the context of the present invention, a packaging unit should be understood as a system or packaging machine which has a plurality of packaging sleeves and outer packaging. The plurality of packaging sleeves is often provided in the form of flat folded, upright packaging sleeves. The outer packaging generally constitutes the packaging for the plurality of packaging sleeves. The plurality of packaging sleeves is provided in the outer packaging inter alia for transport purposes. This takes place for example by inserting the packaging sleeves into the outer packaging or enclosing the packaging sleeves with the outer packaging.

Board or corrugated board are usually used in the prior art as materials for outer packaging. Outer packaging of this type is included here under the term outer box. The substances for the materials for the outer packaging are relatively expensive. A further disadvantage of these outer boxes is that the outer boxes have to be opened at the intended location such as the filling machine, removed from the filling machine and lastly disposed of.

Furthermore, what is problematic with outer packaging designed as an outer box is that it is prone to dust. Outer boxes have a large amount of dust. This so-called outer box dust can be deposited on the packaging sleeves located in the outer box. This is in particular the case when the outer boxes are cut, for example opened with a circular saw in order to unpack the packaging sleeves, usually at the location of filling the foodstuff or beverage packages.

Due to the subsequent filling with sensitive contents, such as for example foodstuffs, the packaging sleeves are however subject to increased sterility requirements. Since the packaging sleeves are often open at two sides, an environment with good sterile conditions is desired and any negative external influences such as soiling, in particular in the form of dust should be avoided. If dirt enters through the open sides into the interior of a packaging sleeve, it must be removed once again with significant effort prior to filling.

The outer boxes designed from board or corrugated board are also not well protected from moisture or water since the material has a high absorption capacity for water. Undesired contact of the packaging sleeves to be protected with a foreign material in the form of water may also result therefrom. This can also lead to weakening of the material of the outer boxes whereby the resistance of the outer packaging to external influences, in particular in the form of bumps and damage may also suffer.

Furthermore, the materials used for the outer boxes are relatively stable. The outer boxes are thus relatively dimensionally-stable packaging, whose external appearance is constant, as soon as the outer box, for example in the form of a folding cardboard box, is produced. Since the packaging sleeves stored in the outer boxes are, however, often packaged directly after production in the outer box and the packaging sleeves have an increased temperature with respect to the environmental temperature, these packaging sleeves packaged in an outer box shrink during the course of their cooling. The proportion of air in the outer box increases through the lower space requirement associated with the shrinking of the packaging sleeves. On the one hand, more unused space is thus wasted in the outer box, on the other hand, there is a greater risk to the packaging sleeves of damage due to excessive movement such as wobbling or vibrating associated with the larger movement space for the packaging sleeves stored in the outer box.

If an actually relatively stable outer box is still damaged and for example the material of the outer box buckles, this may lead to buckling of the side of the outer box in the provided storage space for the packaging sleeves in the outer box. The packaging sleeves stored in the outer box may be damaged by a buckled edge of the outer box.

Moreover, greater effort in relation to the disposal of the outer boxes at the intended location of the packaging sleeves stored therein results due the outer box following its use. The recyclers of the packaging sleeves are confronted with a large amount of waste. The disposal of the outer boxes is also made problematic for this reason since the outer boxes are relatively stable packaging. The waste resulting from the outer packaging made from board also has a large volume and high weight.

Against this background, the object underlying the invention is to design and further develop a packaging unit of the type described in the introduction and previously explained in more detail such that the disadvantages of the prior art are avoided. In particular, costs for the material of the outer packaging itself should be saved. Moreover, outer box dust resulting from unpacking should also be reduced or prevented as far as possible. Lastly, a reduction of the waste resulting from the outer packaging is desired.

SUMMARY OF THE INVENTION

This object is firstly achieved by a packaging machine of the type described in the introduction in that the conveyor unit conveys the packaging sleeve group in a conveyor direction perpendicular to the longitudinal extent of the packaging group and at least one outer packaging unit for preparing an outer packaging-shaping sheet material in a base portion, that, seen in the conveyor direction behind the sheet material in the base position, a sealing unit is provided for sealing of the sheet material enclosed in the packaging sleeve group, that the packaging machine comprises at least one sheet material brake for securing the sheet material, wherein the sheet material brake is arranged seen in the conveyor direction in front of the sealing unit, and in that the packaging machine has a heat treatment unit behind the outer packaging unit to apply the protruding sheet material to the front sides of the packaging sleeve group.

A generic packaging machine with all features of the present disclosure is known from EP-A1-1 000 860.

The previously described object is also achieved by a method for the type described in the introduction, the method being characterised by the following steps:
preparation of the packaging sleeve group,
spreading of a sheet material in a base position,
conveying of the packaging sleeve group in a conveyor direction perpendicular to the longitudinal extent of the packaging group through the spread sheet material, wherein the sheet material is pre-stressed,
passing of the packaging sleeve group of a sealing unit arranged behind the sheet material in the base position seen in the conveyor direction,
sealing of the sheet material by means of the sealing unit,
separation of the sealed sheet material in a sealed area, and
applying heat to the protruding ends of the sheet material.

Per se there are also known already from U.S. Pat. No. 4,707,970 an apparatus and a method for producing a packaging unit from a packaging sleeve group comprising a plurality of flat folded, upright, packaging sleeves and an outer packaging. However, here the outer packaging comprises of outer cartons, the size of which is being adapted to the dimensions of the packaging sleeve group to be wrapped. This kind of outer packaging, however, should be avoided by the present invention.

Lastly, the object is also achieved by a packaging unit of the type described in the present disclosure, wherein the packaging unit being characterised in that the outer packaging is formed at least from a sheet material, in that the sheet material encloses the packaging sleeve group perpendicular to its longitudinal extent, in order to lie around the longitudinal side surfaces of the packaging sleeve group and in that the sheet material is formed of a film, in particular a PE film, preferably a stretch film and/or shrink film made from PE.

The packaging machine according to the invention, the method according to the invention and the packaging unit according to the invention are characterised in that a packaging unit can be easily produced, dispensing with the outer box normally used as an outer package.

In a packaging machine according to the invention, the packaging sleeve group can be effectively transported through the packaging machine in a conveyor direction perpendicular to the longitudinal extent of the packaging group by means of the conveyor unit. A constructively simple design of the packaging machine according to the invention is achieved when a slider is provided as the conveyor unit. The slider can convey the packaging sleeve group through the packaging machine by the packaging sleeve group being pushed perpendicularly to its longitudinal extent in the conveyor direction with the front side of the slider.

Alternatively, the conveyor unit can also be designed as a clamping unit. The clamping unit takes the packaging sleeve group on its end sides, for example by means of a lateral sliders and exerts a pressure on the packaging sleeve group so that it can be transported as a unit through the packaging machine. Such a two-part clamping unit can itself take care of the transport of the packaging sleeve group by the clamping unit travelling on rails through the packaging machine or being suspended so as to be movable on rails. Alternatively, the clamping unit only takes care of the cohesion of the packaging sleeve group and constitutes the conveyor unit in interaction with a conveyor belt on which the package material group can be transported.

The conveyor direction is understood as a direction along the packaging machine. The conveyor direction indicates the intended path of the packaging sleeve group through the packaging machine. The conveyor direction therefore runs regularly from the start of the packaging machine, where the packaging machine is loaded with the packaging sleeves to be packaged, to the output of the packaging machine, where the packaging unit to be produced can be removed.

A simple and convenient outer packaging for the packaging sleeve group can be achieved in that a sheet material is provided by an outer packaging unit. Materials that can be provided in the form of a sheet and in particular wound to rolls can be considered as the sheet material. Normal films known from the prior art such as plastic films or even paper or a combination of these materials can be mentioned as examples here. Unlike the outer box used as outer packaging material hitherto in the prior art, sheet material is characterised in particular by a lighter weight and improved deformability.

This saves inter alia transport costs. Moreover, the disadvantageous outer box dust no longer results, for example when the outer packaging consisting of sheet material is subsequently opened. In addition, a weight or volume reduction of the waste resulting from the outer packaging is achieved as well as high requirements for sterility of the packaging sleeves owing to the subsequent filling with foodstuff being taken into account. The packaging sleeves are also pressed together by the outer packaging with the sheet material resting thereon and fixed at their ends by the sheet material. The intermediate space between two adjacent packaging sleeves present in the outer packaging is thereby reduced with respect to the case described in the prior art regarding outer boxes. More packaging sleeves thus fit into outer packaging and ultimately for further transport on a pallet and into a transport means such as a lorry.

The sheet material ultimately shapes the outer packaging for the packaging sleeves and is also initially provided in a base position. The base position of the sheet material is such that the sheet material is located in the transport path of the packaging sleeve group seen in the conveyor direction. For example, the sheet material can be stretched in a level located in the conveying path of the packaging sleeve group seen in the conveyor direction. The sheet material lies at most on the packaging sleeve group in the base position; the alignment of the sheet material is, however, not influenced by the packaging sleeve group in the base position. The sheet material is in particular not yet pushed in the base position by the packaging sleeve group. The outer packaging can be easily produced by the packaging sleeve group being transported into the conveyor direction through the sheet material. The packaging sleeve group is thereby wound with or encased by the sheet material, the ends located at the front being in particular fixed in the transport direction and thus holding the packaging sleeves together.

Following successful winding of the packaging sleeve group with the sheet material, the sealing unit can seal the sheet material and thus ensure completion of the outer packaging around the packaging sleeve group. The packaging sleeve group is thereby fully encased on four sides of the six sides and the two front sides are partially encased by the sheet material. A completed layer of an outer packaging is generally understood as a coating or a cover, whereby the packaging sleeve group is surrounded or encased, held together and also fully covered in the region of the open upper and lower end of the by the sheet material Outer packaging is achieved by the outer encasement of the individual packaging sleeves organized in the packaging sleeve group, said outer packaging can protect the packaging sleeves from external influences such as for example dirt or moisture. The packaging machine according to the invention thus ensures simple production of a packaging unit, in which, in contrast to the outer boxes known from the prior art, weight and volume can be saved, a cost-effective transport of packaging sleeves enabled, the problem of the outer box dust improved and a reduction of the waste resulting from the outer packaging can be achieved.

Analogous to the previous description of the packaging machine according to the invention, outer packaging for a packaging sleeve group is achieved by the method according to the invention which has a lower weight and a cost saving as well as a lower volume with respect to the outer boxes known from the prior art. Transport costs can thereby be reduced. The outer box dust caused by the outer box also no longer results such that the requirement for improved sterility of the packaging sleeves is fulfilled. The volume as well as the weight of the waste resulting from the outer packaging are also significantly reduced in comparison to the use of outer boxes as outer packaging. The method according to the invention is preferably carried out with a packaging machine according to the invention of the previously described type. The advantages already described in the context of the configurations of the packaging machine are associated therewith.

The same applies to the packaging unit according to the invention in which the weight and the volume of the outer packaging can be significantly reduced in comparison to the previously used outer boxes. The outer box dust can also be avoided as well as the waste resulting from the outer packaging reduced. The packaging unit according to the invention is preferably produced according to a method according to the invention of the previously described type and particularly preferably produced with a packaging machine according to the invention of the previously described type. The advantages already described in the context of the configurations of the packaging machine and the method are associated therewith.

In a first advantageous configuration of the packaging machine according to the invention, the sealing unit is formed by a pair of sealing jaws configured so as to be movable towards one another. The two sealing jaws of the pair of sealing jaws can comprise substantially flat, opposing outer surfaces.

The packaging sleeve group is conveyed between the sealing jaws of the sealing unit when a package unit is being produced and through the spread sheet material to behind the sealing unit seen in the conveyor direction. The sheet material is thereby placed around the packaging sleeve group during the conveying of the packaging sleeve group through the packaging machine. The packaging sleeve group is thus enclosed by the sheet material on all longitudinal sides in order to form the outer packaging, such that only the end faces are still largely uncovered but covered by the sheet material and fastened in the corner regions.

The sealing jaws or working rollers are configured so as to be movable towards one another such that the formation of the outer packaging made of the sheet material can be completed in a simple and automated manner. To this end, the sealing jaws can move towards one another after they have been passed from the packaging sleeve group in the conveyor direction. The sheet material, which already encloses three longitudinal sides of the packaging sleeve group, can thus still be placed around the fourth side of the packaging sleeve group. The outer packaging apart from the packaging sleeve group can be completed by subsequent sealing of the sheet material. The sheet material can thus be effectively sealed in a constructively simple manner in a single step by the sealing unit. The sheet material can also be clamped by moving the sealing jaws or working rollers towards one another.

The movability of the sealing jaws can on the one hand be designed such that two sealing jaws arranged opposite one another are designed so as to be moveable, that is, movable towards one another. The path to be travelled in relation to the individual sealing jaws is thus minimal. On the other hand, only one of the two sealing jaws can also be configured so as to be movable such that the sealing jaw configured so as to be movable can move towards the other and away from it again. In this way, only one of the sealing jaws has to be configured so as to be movable and the other does not necessarily have to be configured so as to be movable.

In a further configuration of the packaging machine according to the invention, the sealing unit is designed as a sealer and cutter. The sealer and cutter have sealing surfaces and a cutting device. Effective completion of a layer of outer packaging can be thereby ensured.

The sealing surfaces ensure the joining of two sheet material parts. This joining can generally be carried out by means of welding or even bonding. The cutting device in turn ensures that the sealed sheet material can be separated again. This preferably occurs in a sealed area of the sealed sheet material. A layer of outer packaging can thus be completed and the resulting finished and encased packaging unit can be separated from the remaining sheet material.

The cutting device can be formed by a blade which is located between the sealing surfaces of the sealing unit and extends outwards or can be moved outwards and back between the sealing surfaces. A constructively simple possibility for forming a cutting device is thereby ensured. Alternatively, a heated wire can also be provided as the cutting device, the wire separating the sealing sheet material in the heated state as a hot wire.

Both means of recording the temperature for sealing the sheet material and means for cooling the joined sheet material, in particular a unit for introducing compressed air can also be provided. It can thereby be ensured that, on the one hand, a sufficiently high temperature for successfully sealing the sheet material is achieved, as well as that, on the other hand, the sealed sheet material is sufficiently cooled, before it is separated by the cutting device.

In addition, the sealing surfaces according to a further configuration of the invention, can provide a welding section in a contact area of the sealing and cutting device. The completion of a layer of a sheet material can thereby be effected in a constructively simple manner since the sealing surfaces of the sealer and cutter only have to be moved close enough to one another in their contact area.

The welding section in the form of a heated section, preferably in the form of heating or welding bands is particularly preferably provided such that quick joining of the sheet material can be carried out with little effort. The heating or welding bands can be heated after moving the sealer and cutter towards one another and after clamping the sheet material by way of the closed sealer and cutter.

A compact, stable packaging unit is achieved by the packaging machine according to the invention having at least one sheet material brake to stop the sheet material, the sheet material brake being arranged, seen in the conveyor direction, before the sealing unit. The sheet material brake can also clamp the sheet material, for example between two brake jaws that are movable towards one another. If the sheet material is stopped, when the packaging sleeve group is conveyed through the sheet material, the sheet material is thus spread or stretched by the transport of the packaging sleeve group through the sheet material and placed under stress. After successful completion of the layer of outer packaging made of the sheet material, the sheet material placed under stress is placed tightly around the packaging sleeve group. An inherently stable and compact arrangement of the packaging sleeves in the encased packaging sleeve group can thereby be achieved.

The packaging machine according to the invention can also, alternatively or additionally, have a support for providing the packaging sleeve group and for at least partially guiding the packaging sleeve group through the packaging machine. Secure conveying of the packaging sleeve group through the packaging machine can thereby be carried out. The packaging sleeve group is generally and hereinafter understood as the still completely unpackaged packaging sleeve group made of packaging sleeves, just like the packaging sleeve group already encased by the sheet material as well as the already completely encased packaging sleeve group, i.e. the completed packaging unit.

The support may be a working table. This constitutes a constructively simple configuration of a support. The support is thus at least a passive part of the conveyor system of the packaging machine, the support also being designed as a conveyor belt. The support can thereby also be an active part of the conveyor system and alternatively to or integrating with the conveyor unit can ensure the transport of the packaging sleeve group through the packaging machine.

Alternatively or additionally, it is possible for the outer packaging to be formed by a pair of feed rollers with the rolled-up sheet material. The feed rollers of the pair of feed rollers can be arranged on two sides opposed in relation to the packaging sleeve group. The sheet material shaping the outer packaging can be rolled up on the feed rollers. A sheet material can thus be spread in a level arranged between the pair of feed rollers.

Alternatively, the sheet material can also initially be diverted following processing of a feed roller such that a level of the sheet material can be stretched for shaping the outer packaging at any position of the packaging machine. A pair of feed rollers is usually characterised in that two feed rollers have substantially parallel running axes. The pair of feed rollers can in this case be arranged such that the two feed rollers are arranged on opposing sides of the packaging sleeve group which leads to a space-saving configuration of the packaging machine.

Additionally, a brake can be integrated into the feed rollers such that when this brake is actuated and simultaneously conveys the packaging sleeve group through the spread sheet material, the sheet material can be placed under stress. This involves the advantages already previously described in the connection with the sheet material brake.

A further aspect of the invention provides that the packaging machine has a heat treatment unit behind the outer packaging unit to apply the protruding sheet material to the front sides of the packaging sleeve group. Further tension and subsequent strengthening of the packaging sleeve group can be achieved by heat treatment if an appropriately designed film is used as the sheet material. While the corners of the two front sides are adequately fixed due to the elongation of the pre-stressed sheet material and thus hold the whole packaging sleeve group together, the ends of the sheet material protrude outwards at the front sides of the packaging sleeve group, substantially by the amount of the excess length of the film width in relation to the length of the packaging sleeve group. As a result of an appropriate application of heat, these protruding ends of the sheet material can be applied and further strengthen the stability of the packaging sleeve group.

It is also possible that the heat treatment unit comprises a plurality of hot air nozzles, in which case preferably four hot air nozzles or blowers should be provided at each front side of the packaging sleeve group. Round or slit nozzles are suitable for this, the use of slit nozzles being more expedient to achieve a uniform folding down of the protruding regions of the sheet material.

It is also possible to provide at each side a single nozzle or blower, the flow direction and, if applicable, the flow intensity of which is alterable with regard to the packaging sleeve group. Within the meaning of the present invention packaging sleeve groups with open or uncovered inner parts of their front sides should be regarded nevertheless as encased packaging sleeve groups. Alternatively, it is possible in case of sufficient protrusion, to shrink the outer packaging at the front sides in order to completely close the front sides of the packaging.

In order to avoid unwanted microbiological effects, it is also possible to weld or seal the protrusion at the front side in order to create a closed inside space without the influence of heavy air movements. The free protrusions at the front sides may be fixed to the packaging body by shrinking.

The sealing of the sheet material can be carried out according to a further configuration of the invention by means of joining. Joining is preferably welding or bonding. The formation of a layer of a sheet material as outer packaging is thereby quickly completed. The achieved compound structure is stable such that the packaging sleeve group is securely protected from external influences.

If, in a further configuration of the invention for sealing the sheet material sealing jaws move towards each other, the sealing of the sheet material can be carried out quickly in a simple manner. The sealing jaws can also guide the sheet material and thus join and clamp between them two parts of the sheet material to be sealed or to be joined.

Additionally, sealing surfaces of the sealing jaws can seal the sheet material. This takes place in particular by means of heating, preferably a heated section, preferably in the form of heating or welding bands. Simple and quick joining of the sheet material parts to be sealed can thereby be achieved. The sheet material can thus be welded together.

According to a further configuration of the invention, the sealed sheet material can be separated for simple completion of the production of the packaging sleeve group encased by the sheet material. The formation of a closed layer of sheet material can thus be completed as outer packaging. The sealed sheet material is, to this end, separated in a sealed area. This sealed area can for example be bonded or welded.

As a result of the fact that the sheet material is separated in the sealed area, the packaging sleeve group encased by at least one layer of a sheet material is, on the one hand, released and, simultaneously, spread for receiving the next packaging sleeve group.

Additionally, according to the present invention, the sealing jaws can be moved away from one another after sealing the sheet material or after separating the sealed sheet material. The sealing jaws can preferably move back into their starting positions. This is unproblematic since after sealing the sheet material the function of guiding the sheet material through the sealing jaws, as well as the function of holding the packaging sleeve group in the current position are no longer required.

A particularly compact and stable packaging unit can, alternatively or additionally, be achieved by the sheet material being slowed, preferably stopped by means of a sheet material brake after a predetermined conveying path of the packaging sleeve group through the sheet material. The earlier the sheet material brake is activated, i.e. the shorter the conveying path already travelled by the packaging sleeve group is, the greater the tension imposed on the sheet material or the elongation of the sheet material when conveying the packaging sleeve group through the sheet material. The desired elongation of the sheet material can thus be set via the advance of the packaging sleeve group and the sheet material brake. This applies both to the packaging sleeve group and also to the packaging sleeve group already encased by the sheet material.

According to a first preferred configuration of the packaging unit according to the invention, it is lastly proposed that the sheet material is formed as a film. In particular, a polyethylene (PE) film is suitable as sheet material for the outer packaging since PE is a favourable and also a light material for use as a sheet material. As a result of the fact that the outer boxes, heavier in comparison to the PE film, which are used in the prior art as outer packaging, are avoided, a lighter and also less voluminous packaging unit is achieved. This also involves advantages in relation to the processability of the sheet material and reduces the costs for the material for the outer packaging.

In this case, it is particularly preferably a stretch film or shrink film made of PE. Stretch films have the advantage that they are highly flexible and can thus withstand large stresses. The sheet material can thus withstand the elongation resulting from conveying the packaging sleeve group through the sheet material without sustaining damage. A packaging unit made of packaging sleeves and stretch film is thus characterised by strong cohesion since, after a layer has been formed around the packaging sleeve group, the stretch film exerts a pressure on the packaging sleeve group and thus ensures a compact, stable unit.

Generally, a distinction can be made between two types of stretch films. On the one hand, there are stretch films which can be bonded, but not welded. On the other hand, there are stretch films which cannot be bonded, but can be welded, these second, weldable stretch films preferably being used. In contrast, shrink films can be further shrunk following processing. By using a stretch film, in particular a weldable stretch film or even a shrink film, a packaging unit, which constitutes a unit made of packaging sleeves and shrink film, can be designed in a particularly compact manner.

The space used by the packaging unit, for example during transport, can be reduced in the manners described. The packaging sleeves are pressed together through the sheet material, whereby the intermediate space between two adjacent packaging sleeves located in the outer packaging is reduced. More packaging sleeves thus fit into outer packaging and, ultimately for further transport, on a pallet and into a transport means such as a truck. A packaging unit is also achieved which has high stability due to the packaging sleeve resting closely on each other.

A further advantage of the use of a weldable stretch film or shrink film made of PE is that the stretch film or shrink film can be welded under stress. Simple processability of the stretch film or shrink film and thus advantageous production of a packaging unit can thereby be ensured.

According to a further preferred configuration of the invention, the film used is PE shrink film with a thickness in the region of 15 to 45 µm, particularly preferably with a thickness of 25 to 40 µm and most preferably with a thickness of 35 µm.

Moreover, the film used for the outer packaging cannot be designed to be completely air-permeable or perforated. As a result, the excess air that results when shrinking the still hot packaging sleeves packaged directly after production cannot escape either through the non-air-permeable film or through the perforations provided in the film.

In addition, the danger of damaging the repackaged packaging sleeves due to a buckled outer box formed for example of board or corrugated board is avoided since the danger of buckling is no longer posed in the case of outer packaging made from sheet material or film.

The advantages previously described in connection with the packaging machine according to the invention, the method according to the invention or the packaging unit according to the invention are not limited to the respective embodiment of the invention. Even though the advantages are explicitly described only in connection with one of the embodiments, they are also associated with the other embodiments of the present invention.

BRIEF DESCRIPTION OF THE DRAWINGS

The invention is explained below in greater detail based on a drawing representing merely preferred exemplary embodiments. The drawing shows.

DESCRIPTION OF THE INVENTION

Figure 1A:
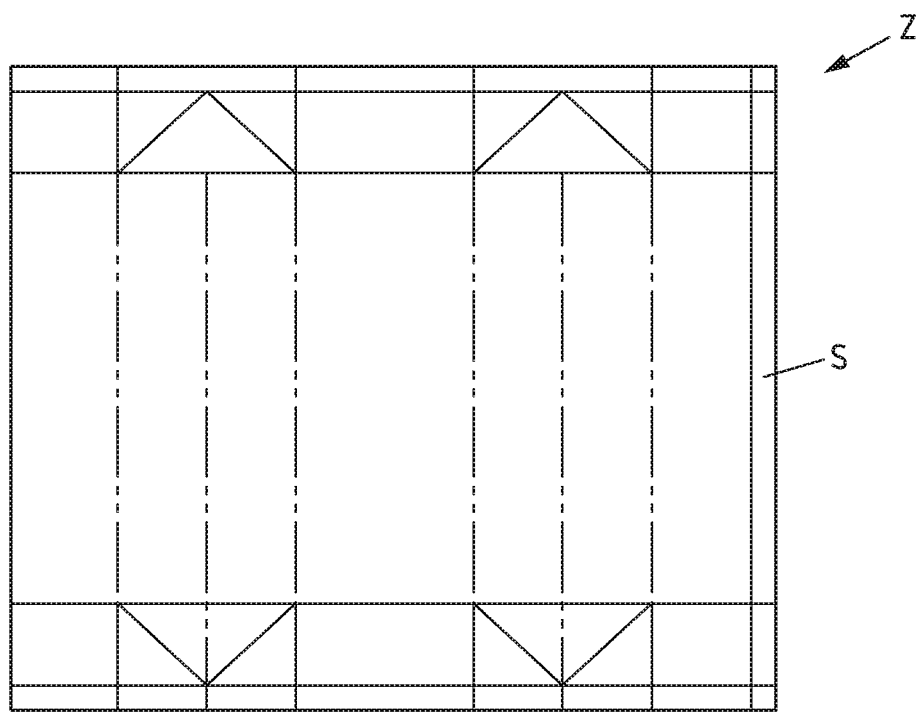
FIG. 1A a blank known from the prior art for folding a packaging sleeve.

A blank Z known from the prior art is represented in FIG. 1A from which a packaging sleeve can be formed. The blank Z can comprise a plurality of layers of different materials, for example, paper, cardboard, plastic, metal, in particular aluminium and is generally laminated. The blank Z has a plurality of fold lines which are supposed to facilitate the folding of the blank and divide the blank into a plurality of surfaces. A packaging sleeve can be formed from the blank Z by the blank Z being folded such that a sealing surface S to be recognised on the right side of the blank Z can be connected, in particular welded with the left edge of the blank Z.

Figure 1B:
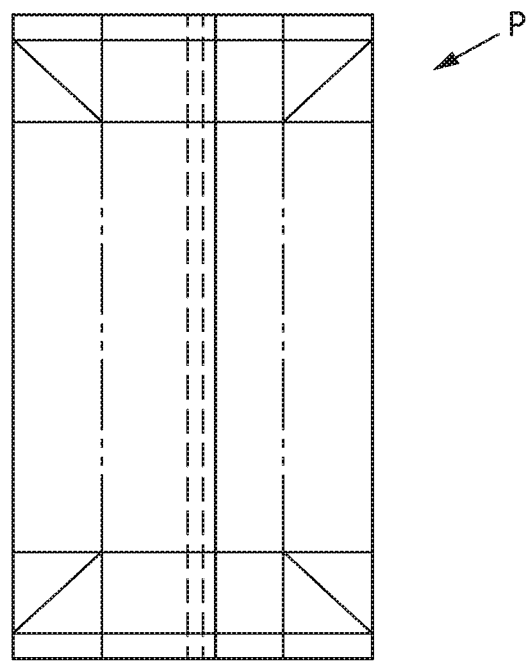
FIG. 1B a packaging sleeve known from the prior art which is formed from the blank represented in FIG. 1A, in the flat folded state, FIG. 2A a first exemplary embodiment of a packaging machine according to the invention, in a schematic side view, FIG. 2B a further exemplary embodiment of a packaging machine according to the invention, in a schematic side view, FIG. 3A a detailed view of the region C of the packaging machine from FIG. 2A or 2B, FIG. 3B the detailed view from FIG. 3A in a step subsequent to the step represented in FIG. 3A during production of a packaging unit, FIG. 3C the packaging machine from FIG. 3A in a step subsequent to the step represented in FIG. 3B during production of a packaging unit, FIG. 3D the packaging machine from FIG. 3A in a step subsequent to the step represented in FIG. 3C during production of a packaging unit, FIG. 3E the packaging machine from FIG. 3A in a step subsequent to the step represented in FIG. 3D during production of a packaging unit, after the separation of the sheet material, FIG. 3F the packaging machine from FIG. 3A after the release of the enclosed packaging sleeve group, after the separation of the sheet material, FIG. 4A a sealing unit of the packaging machine according to the invention from FIG. 3A in plan view in a first step during the sealing of the sheet material, FIG. 4B the sealing unit from FIG. 4A in a step subsequent to the step represented in FIG. 4A during the sealing of the sheet material, FIG. 4C the sealing unit from FIG. 4A in a step subsequent to the step represented in FIG. 4B during the sealing of the sheet material, FIG. 5A the treatment of the protruding ends of the sheet material at the front sides of an enclosed packaging sleeve group by means of hot air with an adequate length of the projecting sheet material in perspective view, FIG. 5B the treatment of the protruding ends of the sheet material at the front sides of an enclosed packaging sleeve group by means of hot air with only short projecting sheet material in perspective view, and FIG. 6 a pallet with a plurality of packaging units according to the invention.

A packaging sleeve P known from the prior art and folded and connected in the above-described manner is represented in FIG. 1B in the flat folded state. A plurality of packaging sleeves P can be combined, in particular stacked or placed together in a row in the flat folded state in a particularly space-saving manner to form a unit. The packaging sleeves P are thus for example stacked at the location of production and transported in a stacked manner to their intended location, such as the location for filling. The packaging sleeves P can be unstacked and unfolded there in order to be filled with contents, for example with foodstuffs. The packaging sleeves P to be stacked and further transported are open on two opposing sides, above and below in the representation according to FIG. 1B.

Figure 2A:
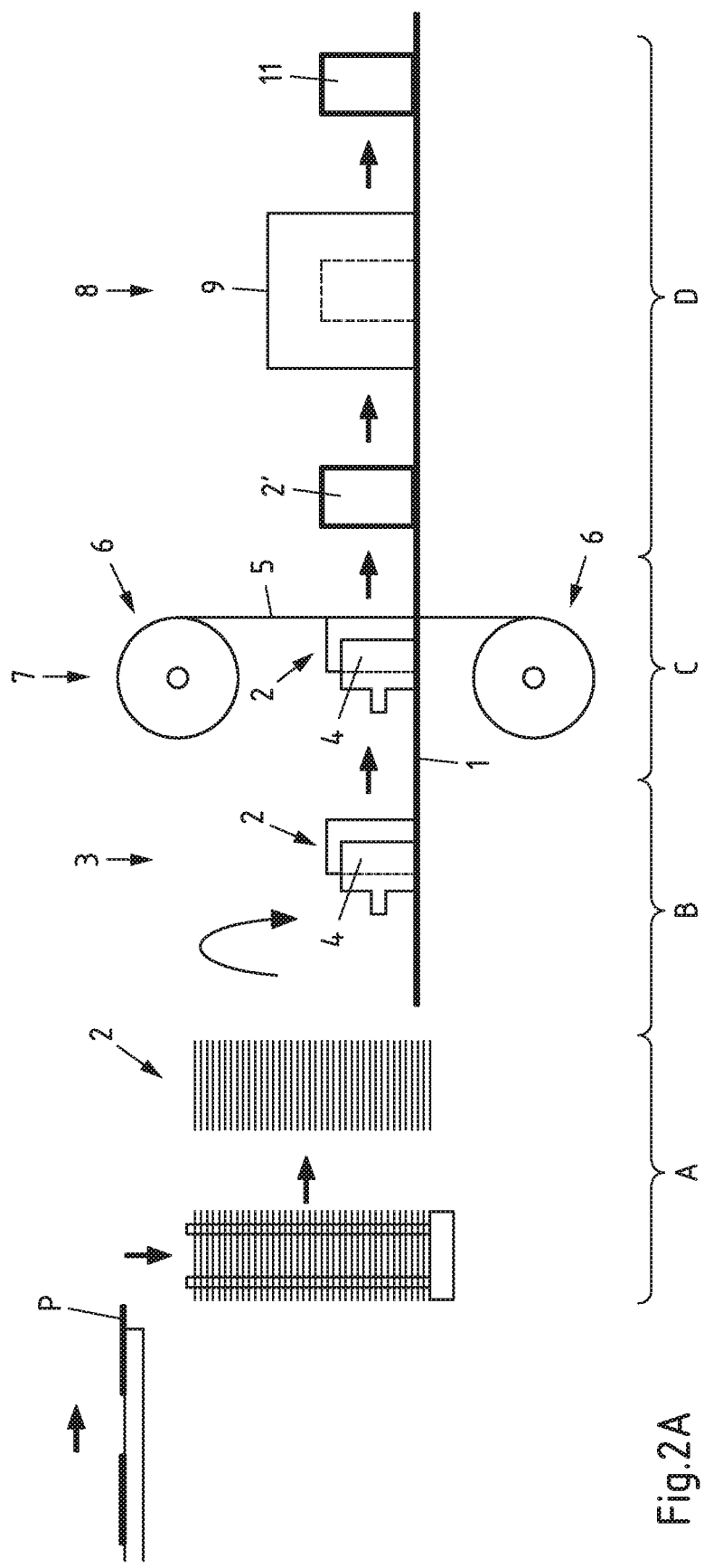

FIG. 2A shows a schematic side view of a first exemplary embodiment of a packaging machine according to the invention. Individual packaging sleeves P are initially supplied to the packaging machine and stacked in a magazine 1. A group of packaging sleeves P is taken from a magazine in an extraction unit indicated in the region A and arranged in a transport direction in region B, on a support represented as packaging sleeve group 2, transverse to a transport direction not marked by arrows. This packaging sleeve group 2 is supplied on a support and then to the region C of the packaging machine, which is represented in greater detail in FIG. 3A to 3F. There, a conveyor unit 3 conveys the packaging sleeve group 2, which is laterally pressed together by holding plates 4, through a sheet material 5. The sheet material 5 is provided by the outer packaging unit 7 initially in a base position. When conveying the packaging sleeve group 2 through the sheet material 5, the sheet material 5 is placed around the packaging sleeve group 2, the sheet material 5 no longer being present in the base position. Ultimately, a packaging sleeve group 2' encased by the sheet material 5 results. This encased packaging sleeve group 2' is then transferred into the region D of the packaging machine by the packaging sleeve group 2' being supplied to a heat treatment unit 8, the encased packaging sleeve group 2' being heated in a heat tunnel 9.

Heating the packaging sleeve group 2', which is already encased by sheet material 5, in a heat treatment unit 8, is particularly expedient because in the production in the outer packaging unit 7 explained above, all longitudinal sides of the packaging sleeve group 2 and, due to the pre-stressing and elasticity of the sheet material 5 used, the front sides are also covered in a form-fitting manner by the sheet material 5 in their corner regions and, as a result thereof, also along their surrounding edges, according to the length of the projection, that is, the difference between the width of the sheet material 5 and the length of the packaging sleeve group 2, the sheet material 5 still protrudes at a greater or lesser distance from the front surface. As a result of the heat treatment in the heat tunnel 9, it is possible, in particular by means of an appropriately guided input of the hot air, to turn the sheet material 5 protruding in the region of the front surfaces over onto the front face and connect it more or less firmly there to the other turned-over regions of the protruding sheet material 5, it being possible to utilize the softening point of the expediently used PE film.

Figure 2B:
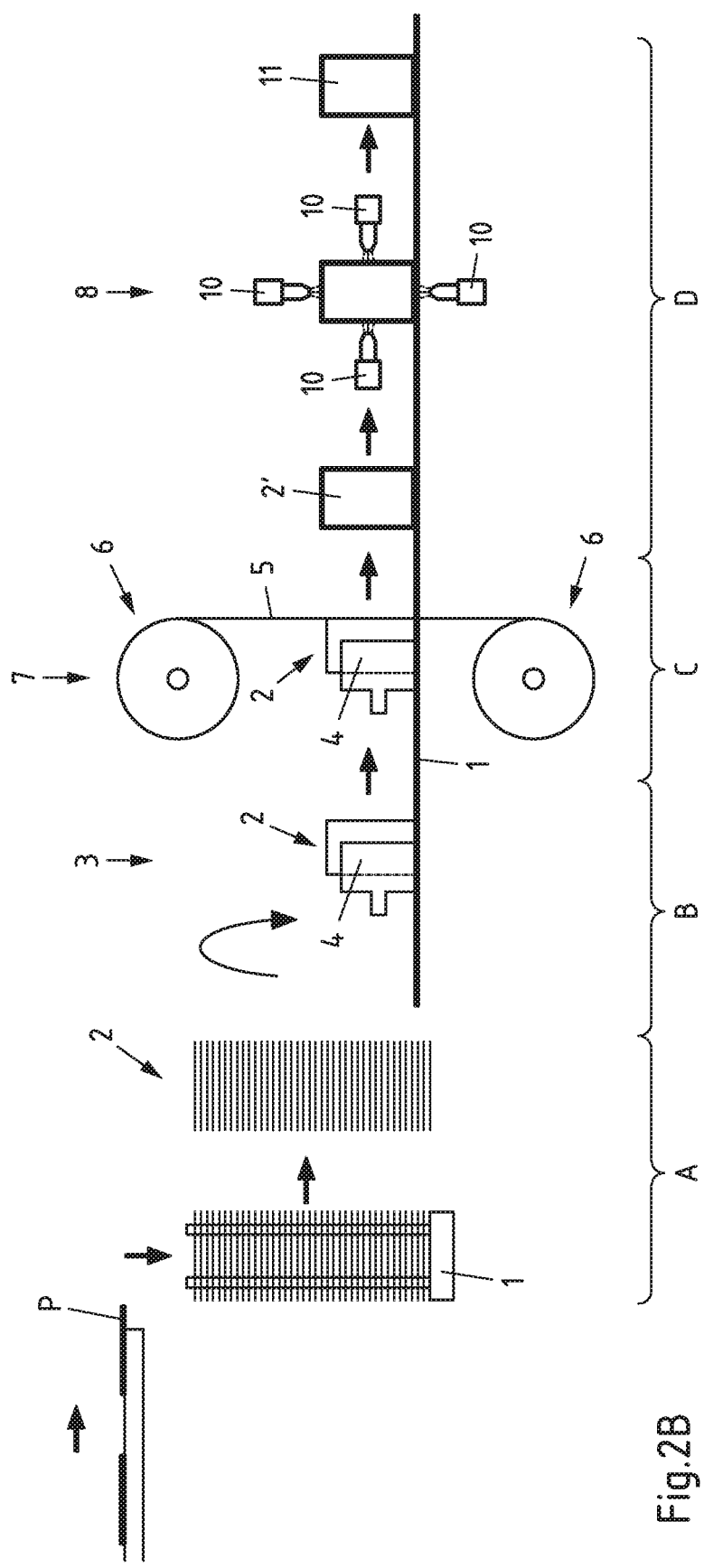

As an alternative to the use of the heat tunnel 9 shown in FIG. 2A, it is also possible, as illustrated in FIG. 2B, to fully dispense with a heat tunnel 9 and, instead of said heat tunnel, to use a plurality of hot air nozzles 10 that are arranged in the region of the front surfaces such that the hot air from the hot air nozzles 10 turns over the sections of the sheet material 5 towards the middle of the front face of the packaging sleeve group 2' and is solidified there, where appropriate by a supply of cold air. The exact application with hot air is explained in more detail below with reference to FIGS. 5A and 5B.

The produced packaging unit 11 is thus a system or a packaging system comprising a plurality of packaging sleeves P, as is represented for example in FIG. 1B, and an outer packaging made from the sheet material 5. A plurality of packaging sleeves P in a flat folded upright state are arranged in a packaging unit 11. The outer packaging surrounding this plurality of packaging sleeves P provides protection for the packaging sleeves P from external influences such as bumps, damage or soiling.

FIG. 3A shows region C of the packaging machine from FIG. 2A or 2B in a detailed view. The packaging sleeve group 2 is held on the support 1 by the conveyor unit 3. The conveyor unit 3 comprises, on the front sides of the packaging sleeve group 2 respectively, a holding plate 4, between which the packaging sleeve group 2 is pressed together, and thus overcomes the restoring forces present in all flat-folded packaging sleeves P. The holding plates 4 are moveably suspended on a rail 13 by means of guide elements 12. A slider not visible in FIG. 3A preferably takes the packaging sleeve group 2 seen in the conveyor direction at its rear longitudinal side, the slider length corresponding to the length of the packaging sleeve group 2, to slide all upright packaging sleeves P exactly parallel in the direction of the sheet material 5. The outer packaging unit 7 has a pair of feed rollers 14, 15. The feed roller 14 is arranged above the support 1A and the feed roller 15 is arranged below the support 1A and below the packaging sleeve group 2. A sheet material brake 16 with two brake jaws 16A and 16B respectively can be seen between the deflection rollers 17A and the packaging sleeve group 2 respectively. The ends of both sheets are each deflected towards each other around a deflection roller 17A and welded together by a seam 5E.

In FIG. 3B a step subsequent to the step represented in FIG. 3A during production of a packaging unit 11 is represented. In this, the packaging sleeve group 2 is already conveyed part of the way through the conveyor unit 3 using the slider not shown through the spread sheet material 5. The sheet material 5 is thus no longer provided in its base position (oriented in a vertical plane), but rather lies, deflected around residential deflection rollers 17B, around the longitudinal side surfaces of the packaging sleeve group 2. Here, the clear opening between the deflection rollers 17B matches exactly the height of the packaging sleeve group 2. Thus, the packaging sleeve group 2 is initially partially wound up with the sheet material 5. While the packaging sleeve group 2 is conveyed further through the sheet material 5, the sheet material 5 is unwound by the feed rollers 14, 15 of the outer packaging unit 7, as shown by the two arrows.

The further transport of the packaging sleeve group 2 is shown in FIG. 3C, where the entire lower longitudinal side is covered with sheet material 5 and the conveyer unit 3 is shown almost in its end position.

Figure 3D:
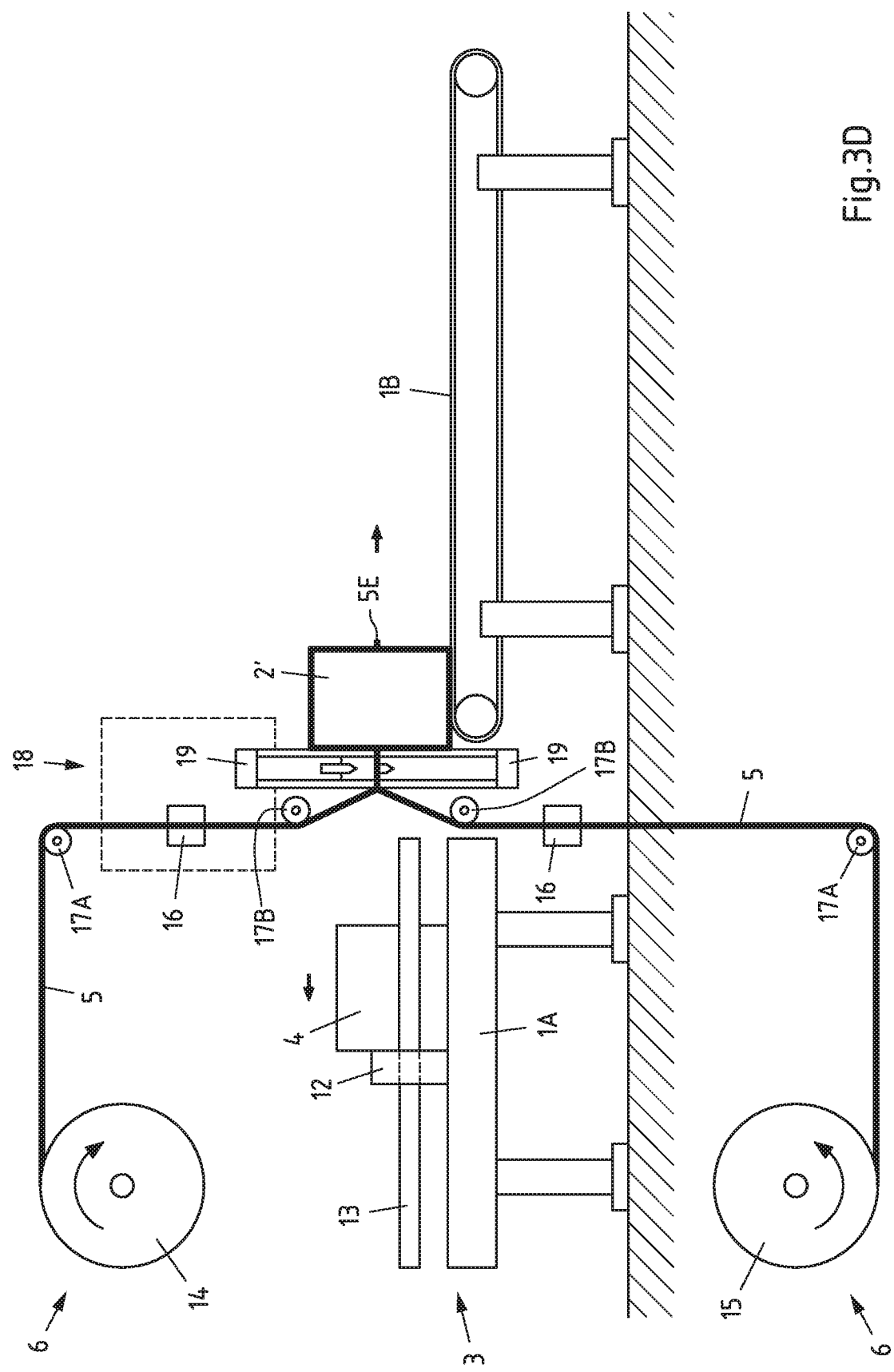

FIG. 3D shows in a next step that the packaging sleeve group 2' encased all around its longitudinal sides is situated in its end position moved by the conveyer unit 3, while the conveyer unit 3 is moved back into its starting position.

Flush with the rear longitudinal side of the packaging sleeve group 2' runs a vertically moveable sealing unit 18 that has two sealing jaws 19 that are moveable towards and away from one another. In the position shown in FIG. 3D, the two sealing jaws 19 are already moved towards one another and weld the sheet material 5 to a weld region that borders directly on the rear longitudinal side of the packaging sleeve group 2' in the conveyor direction. So that the sheet material 5 remains tightened during this process, the sheet material brakes 16 now act on the sheet material 5 and prevent said sheet material from being unwound further by the feed rollers 14 and 15.

Figure 3E:
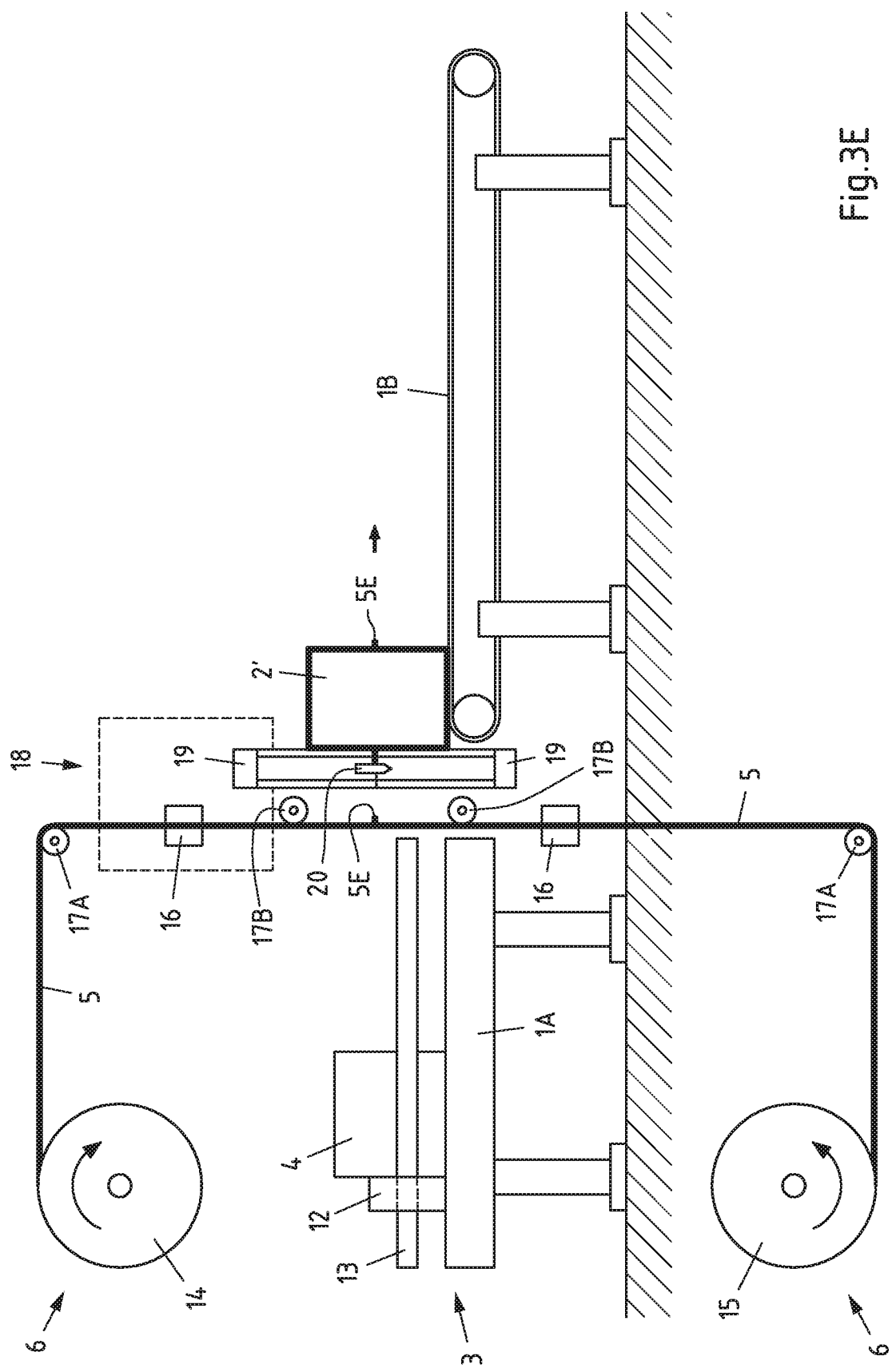

The next treatment step is shown in FIG. 3E, in which the two sealing jaws 19 are still in their sealing position and the weld region is separated across the entire width of the sheet material 5 by a blade that is only suggested, so that the sheet material 5 is again in its base position (compare FIG. 3A) between the rollers 14 and 15.

Finally, it is shown in FIG. 3F that the two sealing jaws 19 are separated from one another again and have reached their starting position. The packaging sleeve group 2 fully enclosed on their longitudinal sides is moved further in the conveyor direction, preferably with a transport means 1B, which is the extension of the support 1A. The packaging sleeve group 2' has a front and a rear weld seam 5E.

Figure 4C:
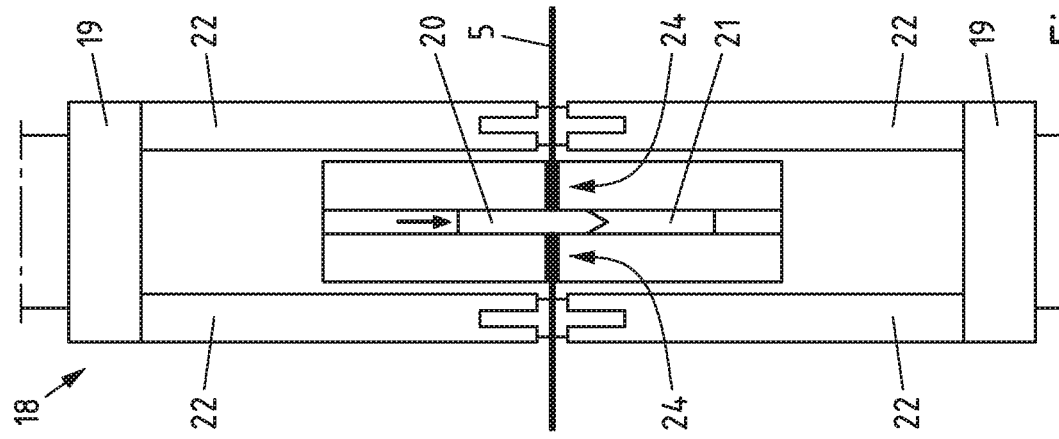

As already mentioned, the packaging machine further comprises sheet material brakes 16 that can clamp or release the sheet material 5. In this way the sheet material 5 can be spread or stretched when the packaging sleeve group 2 is conveyed through the sheet material 5 so that tension is imposed on the sheet material 5. This state is represented in FIG. 3B, wherein the sheet material brakes 16 are closed. Thus, the sheet material 5 is clamped while the packaging sleeve group 2 is conveyed through the sheet material 5. FIG. 4A shows a sealing unit 18 of the packaging machine according to the invention in a first step during the sealing of the sheet material 5. The sealing unit 18 is formed as a sealer and cutter. The sealing jaws 19 of the sealing unit 18 comprise external clamping jaws 22 whose ends clamp the sheet material 5 in the represented, contracted state of the sealing jaws 19. In one of the sealing jaws 19, the cutting device is arranged in the form of a moveable blade and in the other, opposite, sealing jaw 19 the counter piece to the cutting device 20 is arranged in the form of a slot 21 for the blade 20. In addition, sealing surfaces 23 are provided in the sealing jaws 19 between the clamping jaws 22, which are also designed moveably. Thus, the blade 20 arranged between the sealing surfaces 23 and the slot 21 arranged between the sealing surfaces 23 are moved towards each other by means of the sealing surfaces 23 moving towards each other. In the illustration according to FIG. 4A, the sealing surfaces 23 are arranged in a position moved apart from each other. The sealing surfaces 23 can in general provide a welding section as a heatable section, in particular in the form of heating or welding bands, in the contact zone of the sealing surfaces 23.

Figure 4B:
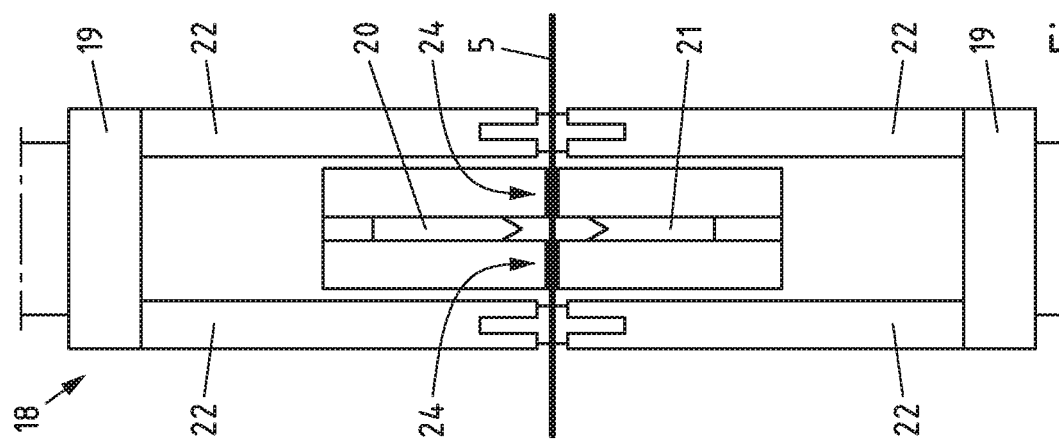
Figure 4A:
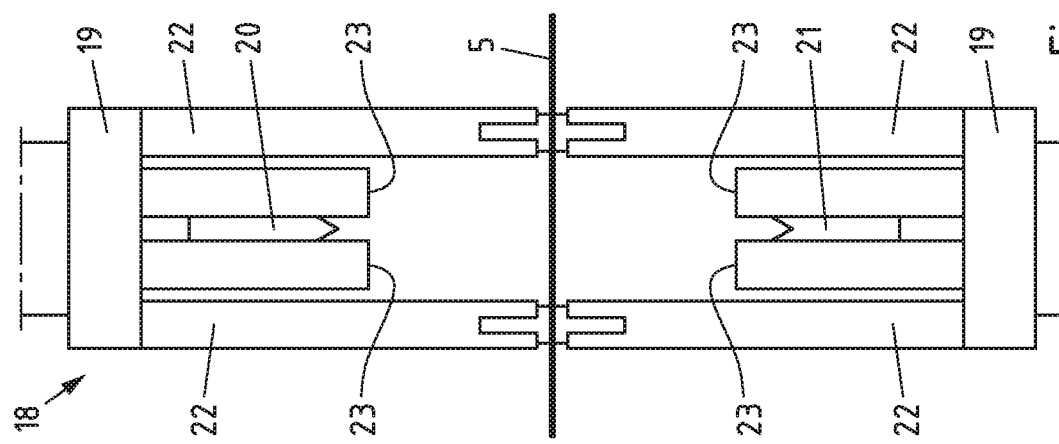

In FIG. 4B the sealing unit 18 is represented in a step subsequent to the step shown in FIG. 4A during the sealing of the sheet material 5. In contrast to the illustration in FIG. 4A, the sealing surfaces 23 are arranged moved together so that the sheet material 5 is between the sealing surfaces 23 in the contact zone of the sealer and cutter. Furthermore, for example by heating the heatable section in the contact zone of the sealing surfaces 23, a sealed area 24 of the sheet material 5 is formed. Both parts of the sheet material 5 are thus joined in the sealed area 24. The blade 20 of the cutting device is arranged in an unextended state, that is, in a state not extended into the slot 21.

FIG. 4C shows the sealing unit 18 in a step subsequent to the step represented in FIG. 4B during the sealing of the sheet material 5. In contrast to the illustration according to FIG. 4B, the blade 20 is arranged in an extended position. For this purpose, the blade 20 is retracted into the slot 21 in the opposite sealing jaw 19. Thus, the sheet material 5 is cut through, namely in the sealed area 24 or between the two sealed areas 24 of the sheet material 5.

After the sealing and separating of the sheet material 5 have taken place, the blade 20 can move back between the sealing surfaces 23. In addition, all of the sealing jaws 19 can move apart from each other again so that the starting position of the sealing unit 18 is reached again. In this way, on the one hand, the at least partially encased packaging sleeve group 2' is released, and on the other hand, a new sheet material 5 in the base position is also provided.

Figure 5A:
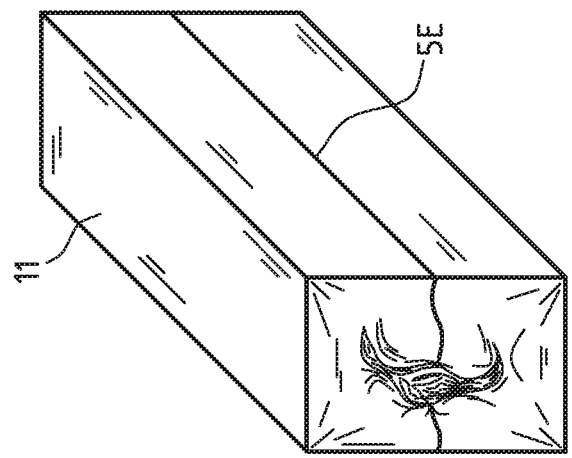
Figure 5A:
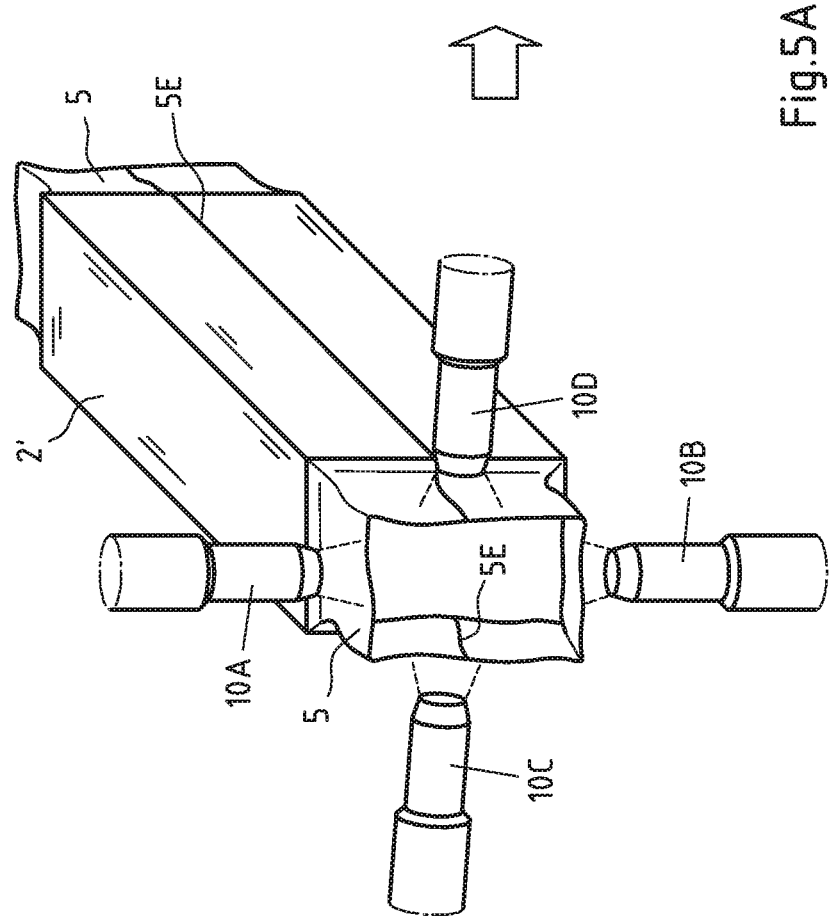
Figure 5B:
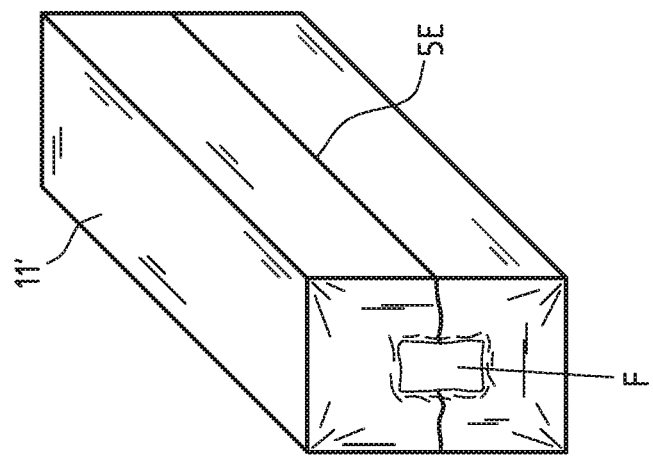
Figure 5B:
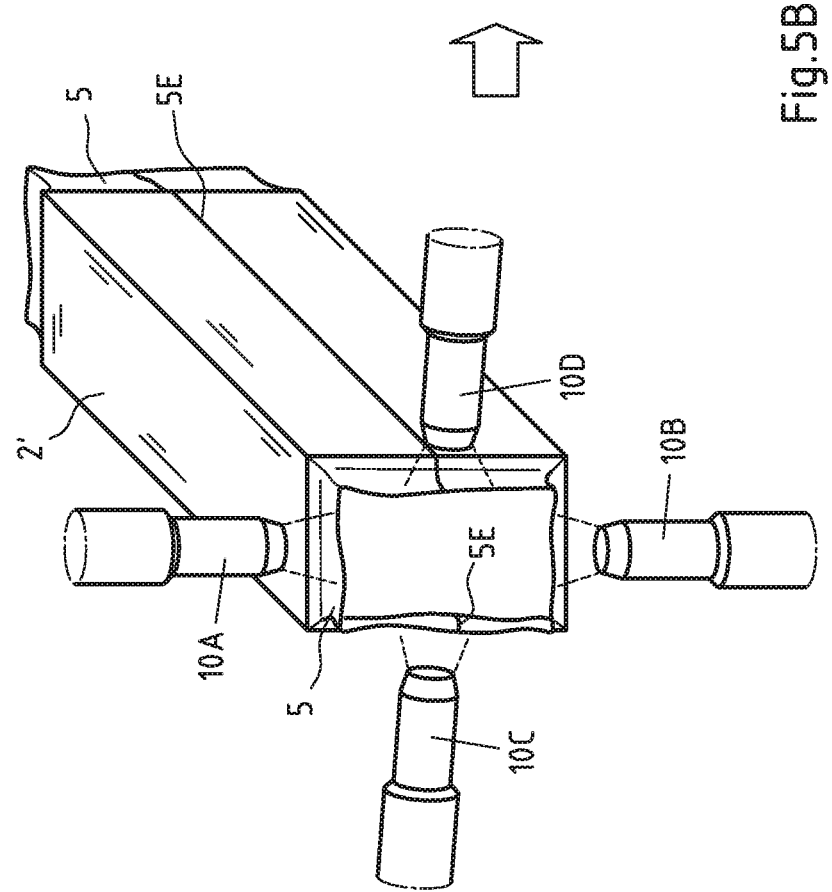

FIGS. 5A and 5B show, in perspective view for better understanding, how the projecting ends of the sheet material 5 can be deflected at the front sides of the packaging sleeve group 2' by means of hot air. For this purpose, preferably four hot air nozzles 10A, 10B, 10C and 10D are arranged at both front sides of the packaging sleeve group 2', of which only the front nozzles are shown. It can immediately be seen that as a result of the application on the protruding ends of the sheet material 5, said ends rest on the front sides of the packaging sleeve group 2' and can be welded together there, as is visible in the image on the right, where a finished packaging unit 11 is represented. Due to the relatively high quantity of material of the welded ends of the sheet material 5, said sheet material has an irregularly shaped structure in the middle region of the front sides, which is, however, harmless for the function of the outer packaging. It can further be seen that the weld seams 5E are turned over at the front sides. Preferably, hot air is initially fed into the opposite nozzles 10A and 10B so that the projecting upper and lower ends of the sheet material rest on the front side of the packaging sleeve group 2' before the nozzles 10C and 10D are activated, such that the entire protruding sheet material 5 is laid flat and welded together. It is clear that no welding should take place between the sheet material 5 and the coating of the outer packaging sleeves. Finally, it can clearly be seen in FIG. 5A that the packaging sleeve group 2' tightly covers the packaging sleeve group 2' in the region of its front sides, both at its corners and along its edges, whereby a fixed unit is created that is dimensionally stable and thus easy to transport.

FIG. 5B shows an alternative illustration in which the width of the sheet material 5 is shorter in relation to the length of the packaging sleeve group 2', resulting in only a small amount of projecting sheet material 5. As a result thereof, the front sides of the packaging sleeve group 2' cannot be fully covered with sheet material 5 if the protruding ends are turned over onto the front sides and welded together. In the illustration on the right of FIG. 5B, it can be seen, on the contrary, that a type of window F forms in the interior of the front sides. Such an embodiment of a finished packaging unit 11' is desirable if, for example, no thickening due to sheet material 5 welded together is to take place at the front sides.

Finally, FIG. 6 shows a usual pallet 25, known from the prior art, which is loaded with a plurality of packaging units 11 according to the invention. For this purpose, the individual packaging units 11, which are formed from a packaging sleeve group 2 comprising a plurality of packaging sleeves P and an outer packaging formed from a sheet material 5, are stacked on the pallet 25. Such pallets 25 loaded with the packaging units 11 according to the invention are provided for the further transportation of the packaging sleeves P, for example to the intended locations for the purpose of filling and producing the finished packaging.

It can also be seen from FIG. 6 that the edges of the packaging units 11 stacked on the pallet 25 are provided with edge protection 26 only applied for transport, for example made from reinforced cardboard. The whole of the packaging units 11 and edge protection strips 26 as well as at least the carrying side of the pallet 25 is then wrapped in a shrink film and/or stretch film and, where appropriate, heat is applied thereto so that it forms a fixed unit that cannot slip during transport by lorry.

An exemplary system represented in FIG. 6 comprises several various advantages compared to the systems known from the prior art, for example packaging units made from packaging sleeves packaged in an outer box as outer packaging. Here the clearly more cost-effective outer packaging made from sheet material should be mentioned first. In addition, the weight can be reduced compared to the solutions from the prior art. Furthermore, waste resulting from the outer packaging can be reduced and a packaging unit 11 or 11' that provides better protection against soiling, for example in the form of dust from outer boxes, can be achieved.

The invention claimed is:

1. A packaging machine for producing a packaging unit from a packaging sleeve group comprising a plurality of flat folded, upright, packaging sleeves, and an outer packaging, the packaging machine comprising at least one conveyer unit for conveying the packaging sleeve group, at least one outer packaging unit for preparing an outer packaging-shaping sheet material in a base position, a sealing unit for sealing of the outer packaging-shaping sheet material enclosed in the packaging sleeve group, and holding plates for laterally pressing together the packaging sleeve group, the holding plates each being moveably suspended on a rail in a direction of transport of the conveyer unit, wherein, in the base position, the sheet material is stretched across the conveyer unit such that the sheet material is stretched above and below the conveyer unit and the sealing unit is positioned downstream of the outer packaging-shaping sheet material in the direction of transport of the conveyer unit, wherein the at least one conveyor unit conveys the packaging sleeve group in the direction of transport, at least one sheet material brake for securing the outer packaging-shaping sheet material arranged, at least in the base position, upstream of the sealing unit in the direction of transport, and a heat treatment unit downstream of the at least one outer packaging unit to apply protruding sheet material to downstream sides of the packaging sleeve group.

2. The packaging machine according to claim 1, wherein the sealing unit comprises a pair of sealing jaws.

3. The packaging machine according to claim 1, wherein the sealing unit is formed as a sealer and a cutter, wherein the sealer and the cutter comprises sealing surfaces and a cutting device.

4. The packaging machine according to claim 3, wherein the sealing surfaces each comprise a welding section adapted to seal the sheet material at a zone of contact between the sealing surfaces and the sheet material.

5. The packaging machine according to claim 1, wherein the packaging machine comprises a support for preparing the packaging sleeve group and for at least partially conveying the packaging sleeve group through the packaging machine.

6. The packaging machine according to claim 1, wherein the at least one outer packaging unit comprises a pair of feed rollers with wound sheet material, wherein the pair of feed rollers are arranged on two opposite sides relative to the packaging sleeve group.

7. The packaging machine according to claim 1, wherein the heat treatment unit has a plurality of hot air nozzles.

8. A method for producing a packaging unit from a packaging sleeve group comprising a plurality of flat folded, upright, packaging sleeves, and an outer packaging, with a packaging machine according to claim 1, by the following steps:
- preparing the packaging sleeve group,
- spreading a sheet material in a base position,
- conveying the packaging sleeve group in the direction of transport of the conveyor unit of the packaging machine, through spread sheet material, wherein the sheet material is pre-stressed,
- passing the packaging sleeve group through the sealing unit of the packaging machine arranged downstream of the sheet material in the base position,
- sealing the sheet material by means of the sealing unit,
- separating the sealed sheet material in a sealed area, and applying heat to protruding ends of the sheet material.

9. The method according to claim 8, wherein sealing of the sheet material is achieved by means of joining.

10. The method according to claim 8, wherein sealing jaws of the sealing unit move towards each other to seal the sheet material.

11. The method according to claim 9, wherein sealing surfaces of the sealing jaws seal the sheet material by means of heating.

12. The method according to claim 8, wherein the sealed sheet material is separated by means of a cutting device formed in the sealing unit.

13. The method according to claim 9, wherein after the sealing of the sheet material or after the separating of the sealed sheet material, the sealing jaws move back towards each other.

14. The method according to claim 8, wherein after a pre-determined conveying of the packaging sleeve group through the sheet material, the sheet material is slowed, so that corners of the packaging sleeve group are fixed by the sheet material.

* * * * *